Figure 2:
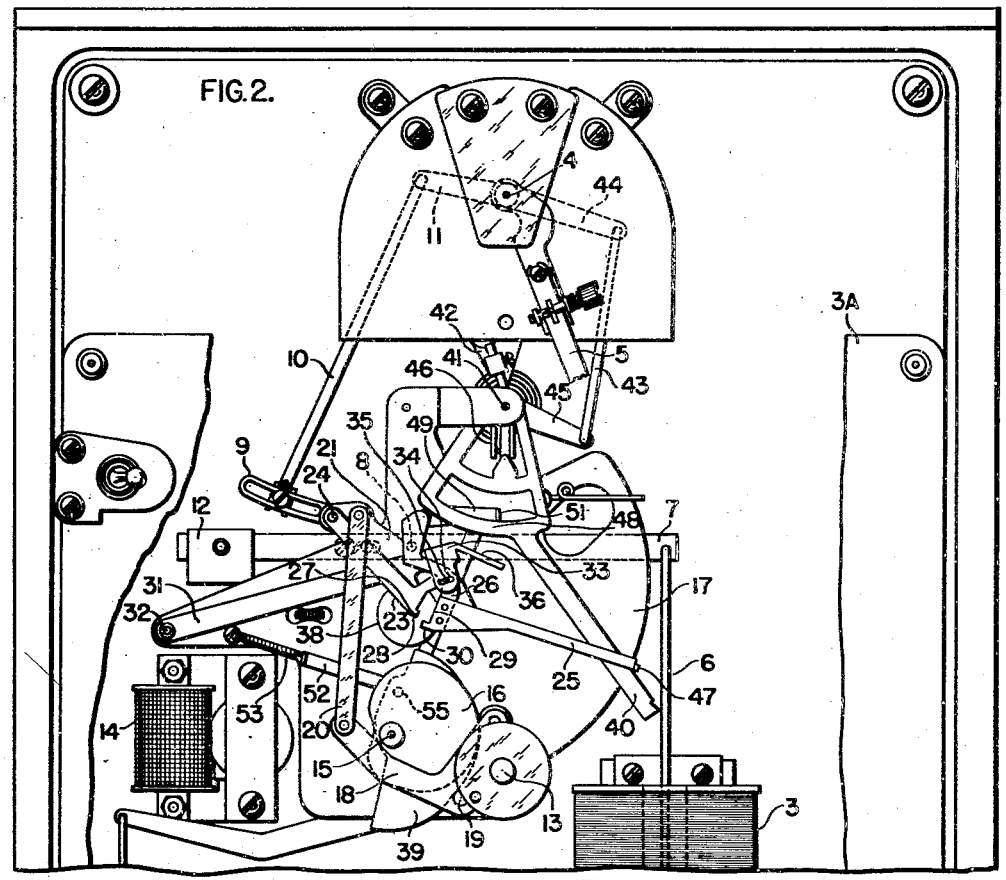

Oct. 26, 1943.   W. G. TRUMBOWER   2,332,954
INTEGRATING MECHANISM
Filed Dec. 12, 1940   2 Sheets-Sheet 1
FIG. I.
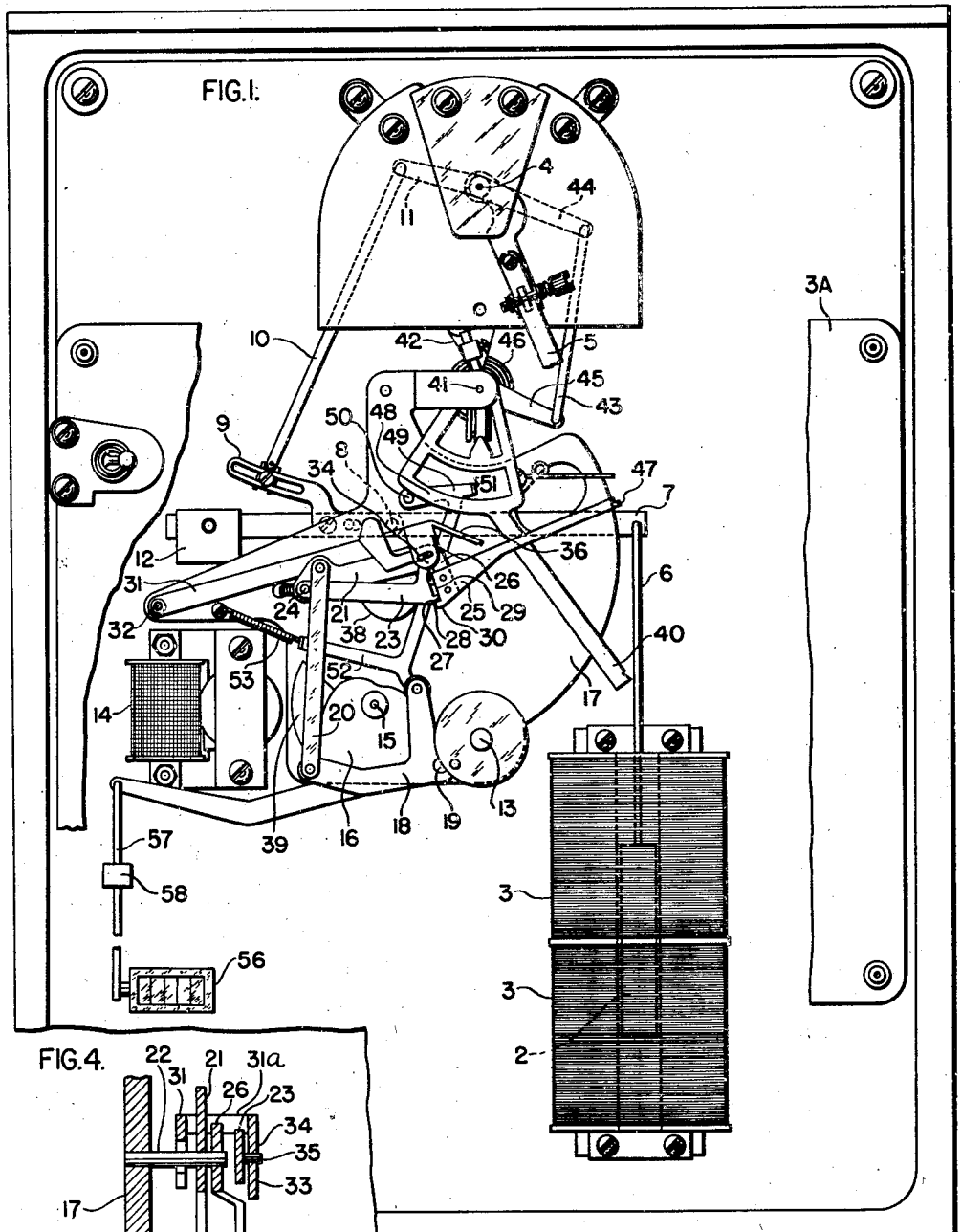
FIG. 4.
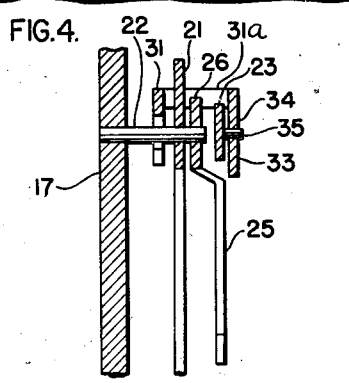
INVENTOR.
WALTER G. TRUMBOWER
BY C. B. Spangenberg
ATTORNEY INVENTOR.
WALTER G. TRUMBOWER
BY C. B. Spangenberg
ATTORNEY Patented Oct. 26, 1943

2,332,954

UNITED STATES PATENT OFFICE 2,332,954

INTEGRATING MECHANISM

Walter G. Trumbower, Glenside, Pa., assignor to The Brown Instrument Company, Philadelphia, Pa., a corporation of Pennsylvania Application December 12, 1940, Serial No. 369,697

2 Claims. (Cl. 235—61)

The present invention relates to flow meters and more particularly to those flow meters that are provided with a counter which serves to totalize the flow that is measured by the meter.

As is well known the differential pressure created by the flow of a fluid past an orifice is proportional to the square of the flow. This being the case, an integrating flow meter must be so constructed that the square root of the flow value must be extracted before the flow is totalized in order to get a correct reading thereof. There are, however, other flow meters, for example those known as the area type, in which the flow through the meter is linear. In the latter type of meter the integrator must be so designed that the square root of the flow is not extracted.

Manufacturers of the two types of flow meters above mentioned have heretofore either been forced to keep on hand two types of integrators or have an integrator designed to be used with one type of flow meter and modified for use with the other. In the first case, there was required an unnecessarily large stock, and in the second, the modified integrator did not work as well as it might.

It is an object of my invention to provide an integrator of the type shown in Harrison Patent 1,743,853, dated January 14, 1930, that is adapted to be used with either type of flow meter. Broadly this may be accomplished by properly designing a drive cam for the integrator sweep arm for each type of meter. By merely substituting one cam for the other the speed of the sweep arm is so controlled that the time required for it to move from its zero position to the position corresponding to the value of the flow may be proportional to the value of the flow or proportional to the square root of the value of the flow. The drive cam for the sweep arm may be so designed that it can be used for other uses than totalizing flow so that the integrator may, if desired, be used for other purposes.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 3:
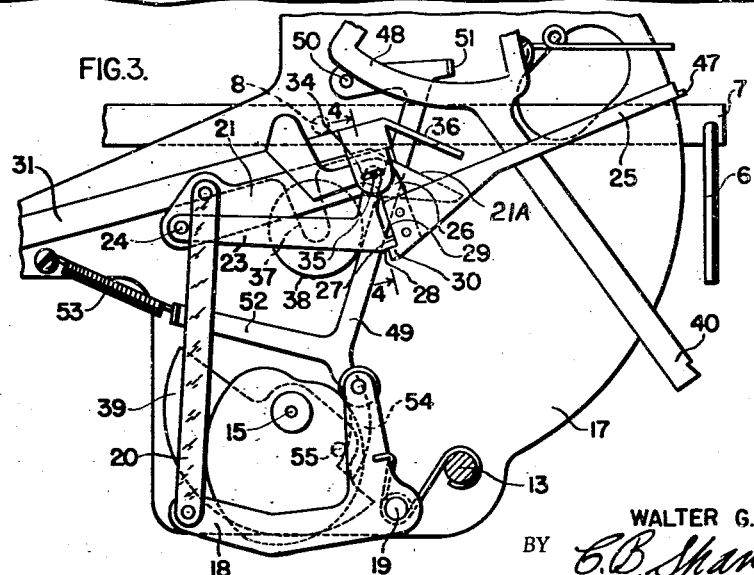

In the drawings:

Fig. 1 is a view of a flow meter having portions broken away to disclose the integrator of my invention, Fig. 2 is a view similar to Figure 1 with the parts in a different position, Fig. 3 is a view of a portion of Figure 1 on a large scale and, Fig. 4 is a view taken on line 4—4 of Figure 3.

In the drawings a metering instrument is illustrated which is particularly adapted to form the exhibiting portion of a flow metering system such as is disclosed in said Harrison Patent No. 1,743,853. The instrument comprises recording and integrating sections, the mechanism of which, when the instrument is used for measuring a fluid flow, is actuated by a differential pressure device of a well known character. The recording and integrating instrument illustrated comprises an axially movable magnetic body or core 2 which is moved by the changes in inductance of a pair of end to end coil sections 3, in which it is positioned and which form part of an impedance bridge transmitting system connecting the differential pressure device and instrument arranged and operating as disclosed in said Harrison patent.

Located within the instrument casing and above a chart plate 3A is a shaft 4 upon which is mounted a pen arm 5. This shaft is rotated to move the pen in response to movements of the core 2, to indicate on a chart (not shown) that is mounted in front of the chart plate the value of the flow being measured. The connection between the core 2 and the shaft 4 consists of a link 6 attached at one end to the core and at its other end to a lever 7 pivoted at 8. A connecting piece 9 is attached to the lever and is adjustably connected at one end of a link 10 which is connected at its other end to an arm 11 attached to the shaft 4. The lever 7 is provided with an adjustable counterweight 12 which serves to counteract the force of the core 2 on the lever 7 and to balance the latter. This lever 7 is free to move in response to changes in position of the core 2.

With the mechanism described the variations in the rate of fluid flow may be electro-magnetically transmitted to the core 2 in the inductance coils 3 and the movements of the core effected by such variations cause corresponding oscillatory movements of the shaft 4 and pen arm 5. A chart hub 13 is driven at a constant speed of preferably one revolution every twenty-four hours by a suitable electric motor 14 so that the chart may be rotated whereby a continuous record of the time and extent of variation in rate of flow is made.

The integrating mechanism of the instrument, to which my invention more particularly relates, comprises a driving shaft 15, which may be driven from the same motor 14 as the chart hub, although at a considerably higher speed, such as one revolution per minute. The various gear arrangements by which the shafts 13 and 15 are connected to the driving motor are well known to those skilled in the art and a detailed description herein is unnecessary. A driving cam 16 is attached to the shaft 15 in front of a supporting plate 17. This cam acts on one arm of a bell crank lever 18, pivoted at 19, the other arm of which through a link 20, causes an arm 21, pivoted on a pin 22 (Fig. 4) in plate 17, to oscillate across the face of the plate. The end of arm 21 has a substantially L-shaped latch member 23 pivoted thereon at 24.

The latch 23 is arranged to lock a sweep arm 25 in fixed relation with the oscillating arm 21 during one portion of each revolution of the cam 16. The sweep arm 25 extends substantially horizontally across a portion of the plate 17 and is formed with a vertically arranged slightly offset projection 26 the upper end of which is pivotally mounted on the pin 22, as shown in Fig. 4. For interlocking purposes, the latch and sweep arm are formed with end surfaces adapted to engage in one position of the parts. The latch has end surface 27 and 28 adapted to contact, respectively, with an end surface 29 and projection 30 of the sweep arm, as shown in Fig. 3.

A lever 31 is pivoted to the plate 17 at 32 adjacent the driving motor 14 and as shown, is formed with its opposite end portion bent outwardly at 31a and rearwardly to form a projecting flange 33. The outer side of the flange is formed with a slot 34, in which a pivot pin 35, carried by the latch member 23, is positioned and on which the lever rests. The pivot pins 22 and 35 are substantially coaxial, as shown in Fig. 4, and the adjacent surfaces of the latch member 23 and sweep arm projection 30 slightly separated. The outer end of the lever 31 is formed with a downwardly inclined projection 36 arranged to be engaged by the arm 21 during the relatching movement hereinafter described. The lever 31 is also provided with a depending tongue 37 on which a counter train driving roller 38 is rotatably mounted and arranged to be brought in frictional contact with the periphery of a driving disc 39 once during each revolution of the shaft 15, except when the shaft 4 is in its zero position, the period of contact with the disc depending on the angular position of a tripping blade 40.

As shown, the disc 39 has a portion of its periphery cut away so that the disc presents a curved surface of approximately 180°. The downward movement of roller 38 being limited by the slot 34, the roller and disc will be out of contact when the cut-away portion of the disc is toward the roller.

As illustrated a tripper blade 40 is pivotally mounted at 41 in the upper part of plate 17. This blade is provided with a counterweight 42 so that the tripper blade assembly is mechanically balanced. The tripper blade and the recording pen are mechanically connected by means of a link 43 that is attached at its upper end to an arm 44 on the shaft 4. At its lower end the link is attached to an arm 45 which is connected with the tripper blade through suitable resilient connection 46. This connection may be of the type disclosed in Harrison Patent 1,856,039, granted April 26, 1932, and serves the purpose of permitting independent movement of the pen arm and tripper blade during times that the latter is held stationary, as will be described below.

With the foregoing portions of the mechanism constructed and arranged as described, the operation of the integrating mechanism is as follows: At the beginning of each operating cycle the latch member 23 is held by the sweep arm 25 in fixed relation with the oscillating arm 21 as shown in Fig. 1, the arm 25 being then at the limit of its counter-clockwise movement about its supporting pin 22. As the shaft 15 continues its rotation, the link 20 causes the oscillating arm to begin a clockwise movement about the pin 22. The clockwise movement of the latter continues without change in the position of the parts 21, 23 and 25 relative to one another until a finger 47 on the end of the sweep arm engages the upper edge of the tripper blade 40. The point in the rotation of the disc 39 at which the finger and tripper blade contact depends on the angular position of the shaft 4 and magnetic core 2 at that instant. This engagement prevents a further clockwise movement of the sweep arm and on a continued clockwise movement of the arm 21, the latch member and sweep arm are relatively moved out of the interlocking position. The unlocking action permits the lever 31 and roller 38 to drop due to the weight of the parts.

When the roller 38 drops into engagement with the curved peripheral portion of the disc 39 it continues in engagement therewith and is thereby rotated until the continued rotation of the disc carries it out of contact with the roller. The rotary movements given to the roller 38 by the disc 39 are summed up by a counting train or revolution counter 56 located in the lower part of the instrument framework and connected to the roller by suitable mechanism, of which various forms are disclosed in the above mentioned Patent No. 1,743,853. For example, that mechanism may comprise a gear and ratchet wheel arrangement for operating a lever connected to a link 57, the parts being held in engagement by a weight 58 mounted on the link 57, which is connected to the counter 56. The rotative movement given the roller 38 on each engagement with the disc 39 is proportional to the angular position of the shaft 4 at the time when the tripper blade 40 is engaged by the sweep arm 25. While the point of engagement of the sweep arm 25 and blade 40 varies with the angular position of the latter, the engagement of the roller and disc ends at the same point in each revolution regardless of lost motion in the tripping mechanism. As the oscillating arm 21 starts its movement in the counter-clockwise direction and approaches the initial position shown in Fig. 1, the latch 23 and sweep arm 25 again come into contact, with the surface 27 contacting with the end of the projection 30. At this time the surface 21A of lever 21 engages end 36 on the lever 31 causing the latter and the latch member 23 to rise, which movement permits the projection 30 to fit under the surface 28 effecting an interlocking action of the latch 23 and sweep arm 25, and thus restoring the parts 21, 23 and 25 in their original relative positions.

Since the blade 40 and sweep arm 25 turn about displaced axes it will be apparent that for each different angular position of the shaft 4 the finger 47 will engage the edge of the blade 40 at a different point along the length of the blade.

In consequence of this fact it will be readily apparent to those skilled in the art that the blade edge may readily be shaped so that whatever the position of the blade may be the angle between the arm and blade will be such that there is very little tendency for the two to slip relative to each other. With the proper relative disposition of the parts as shown in the drawings the edge of the blade 40 may be substantially a straight edge without giving rise to any appreciable slipping between the blade and arm 25. This fact obviously facilitates the manufacture and calibration of the instrument.

In the operations described, it is obvious that no matter what the shape of the tripper blade 40 may be the movement of the sweep arm into contact with the tripper blade tends to move the latter downwardly and thereby cause an inaccurate integrating record. Consequently there is provided a means for holding the tripper blade fixed in position during a predetermined portion of each revolution of the disc 39, during which period the sweep arm and blade come into contact to actuate the integrator mechanism. These provisions comprise an arcuate extension 48 extending laterally from the tripper blade adjacent its upper end and a clamping member 49 automatically operated to hold the tripper blade sector 48 during the clockwise or downward movement of the oscillating arm 25.

The clamping member is pivoted on a stud 50 on the plate 17 at the upper end of the member 49. That portion of the clamping member is provided with a lateral finger 51, the free end of which extends forwardly over the smooth upper edge of the sector 48. The clamping member is further provided with a lateral projection 52 adjacent its lower end. The free end of the projection is connected to a tension spring 53 secured to the plate 17 at a point adjacent the shaft 32. With this arrangement of the parts the locking finger tends to be maintained in contact with the sector 48 at all times due to the action of the spring 53. The lower end of the locking member has a downwardly extending arcuate portion 54, which is arranged to be engaged by an unlocking pin 55 during periodic intervals. The pin 55 is mounted on the disc 39 at the rear side of the latter and in substantial radial alignment with the beginning of the cut away portion of the disc.

During the clockwise movement of the arm 21 the sweep rm engages the blade and the integrating mechanism is actuated. The blade locking action continues until the unlocking pin 55 engages the periphery of the arcuate section 54 of the clamping member. A continuation of this movement causes the clamping member to move in the counter clockwise direction about its pivot point 50, thereby raising the finger 51 out of contact with the sector 48. The clamping finger remains in the raised position as long as the pin 55 acts on the arcuate section 54. When the pin passes out of contact with the end of the clamping member, the clamping member is restored to its locking position under the action of the spring 53. In the present embodiment the tripper blade is locked during substantially the whole clockwise movement of the oscillating arm 21 and unlocked during the counter clockwise movement.

In order that the position at which edge 47 of the sweep arm 25 engages the tripper blade 40 may have some definite relation with the volume of flow being measured it is necessary that the time of travel of the arm 25 from its extreme counter-clockwise position to the point of engagement with blade 40 be in proportion to the square root of the pressure differential. In such a case the speed of the arm 25 must be in linear proportion to the square root of the pressure differential. If the flow is being measured by an area type meter in which the response is in linear proportion to the value of the flow the speed of the arm 25 as it moves from its extreme counter-clockwise position must be in linear proportion to the position of the blade 40.

The cam 16 which serves to drive the sweep arm 25 may be so formed that the speed of this arm during its clockwise movement may vary in accordance with any desired law. Thus by properly designing the cam 16 the arm 25 may move at a constant speed so that the time required to move from its upper position to its point of engagement with blade 40 would be in linear proportion to the flow. In like manner the cam 16 can be designed so that the time of travel of the arm 25 is in linear proportion to the square root of the pressure differential. In either event the upper edge of the blade 40 may take the same shape and would be so formed that when arm 25 engages blade 40 the angle between them will overcome any probability of slipping between the parts before the edge 28 leavs the projection 30. The cam 16 may, of course, be so shaped that it can move the arm 25 through its path in a time proportional to any function of a variable without being limited to the two functions described herein.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, which I claim as new and desire to secure by Letters Patent is:

1. In a universal integrating mechanism, the combination of an element movable through a path to a position depending upon the value of a condition a measurable characteristic of which varies in accordance with a predetermined law as the condition varies lineraly, said element being movable in accordance with the said measurable characteristic, a sweep arm movable through a path intersecting said first mentioned path from a predetermined position to a position in engagement with element, said latter position depending upon the value of said condition, a constantly rotating shaft, a cam shaped in accordance with said law mounted on said shaft to be rotated thereby, a follower engaging said cam, constant speed ratio drive mechanism between said follower and said sweep arm whereby the sweep arm and cam follower will be driven at a speed corresponding to the shape of the cam, a drive member also mounted on said shaft, an integrating counter, and means to operate said counter from said driving member, said last means being controlled by engagement between said sweep arm and element.

2. A universal integrating mechanism including an element movable through a path to a position dependent upon the value of a condition having a measurable characteristic which varies in accordance with a predetermined law as the value of the condition varies linearly, said element being movable in accordance with said measurable characteristic, a sweep arm movable through a second path from a predetermined position to a position determined by engagement with said element, means to move said sweep arm from said predetermined position to said second position in a time interval proportional to the law of said measurable characteristic comprising a constantly rotatable shaft, a cam shaped in accordance with said law mounted on said shaft, a cam follower, a drive linkage between said follower and said sweep arm, a counter, a drive means operated by said shaft for said counter, a catch mechanism to control the application of said drive to said counter and means to operate said catch upon engagement of said sweep arm with said element.

WALTER G. TRUMBOWER.